United States Patent
Sargent

(10) Patent No.: US 9,578,201 B2
(45) Date of Patent: Feb. 21, 2017

(54) METHOD OF DETECTING STEGANOGRAPHICALLY HIDDEN IMAGES VIA LOW-ORDER BIT COMPARISONS

(71) Applicant: Duquesne University of the Holy Spirit, Pittsburgh, PA (US)

(72) Inventor: Adam C Sargent, Mars, PA (US)

(73) Assignee: Duquesne University of the Holy Spirit, Pittsburgh, PA (US)

( * ) Notice: Subject to any disclaimer, the term of this patent is extended or adjusted under 35 U.S.C. 154(b) by 38 days.

(21) Appl. No.: 14/647,731

(22) PCT Filed: Nov. 27, 2013

(86) PCT No.: PCT/US2013/072168
§ 371 (c)(1),
(2) Date: May 27, 2015

(87) PCT Pub. No.: WO2014/085542
PCT Pub. Date: Jun. 5, 2014

(65) Prior Publication Data
US 2016/0269589 A1 Sep. 15, 2016

Related U.S. Application Data

(60) Provisional application No. 61/730,577, filed on Nov. 28, 2012.

(51) Int. Cl.
*G06K 9/00* (2006.01)
*H04N 1/32* (2006.01)

(52) U.S. Cl.
CPC .... *H04N 1/32267* (2013.01); *H04N 2201/327* (2013.01); *H04N 2201/3259* (2013.01)

(58) Field of Classification Search
None
See application file for complete search history.

(56) References Cited

U.S. PATENT DOCUMENTS

| | | | |
|---|---|---|---|
| 7,321,623 B2 * | 1/2008 | Dambrackas | H04N 19/105 375/240.01 |
| 2009/0006990 A1 | 1/2009 | Ossesia | |
| 2012/0203556 A1 | 8/2012 | Villette et al. | |
| 2012/0286028 A1 * | 11/2012 | Simske | G06Q 10/06 235/375 |
| 2013/0009977 A1 * | 1/2013 | Strom | G06T 9/00 345/586 |

OTHER PUBLICATIONS

Deshpande Neeta et al., "Implementation of . . . Various Bits," in IEEE Digital Information Management, 2006 1st International Conference on, pp. 173-178.
L.A. Hiba Jebbar Aleqabie, "Design and Implementation . . . " Journal of Kerbala University, vol. 8, No. 1, Scientific, 2001, p. 8-22.

* cited by examiner

*Primary Examiner* — Oneal R Mistry
(74) *Attorney, Agent, or Firm* — Barbara E. Johnson, Esq.

(57) ABSTRACT

The invention is a method for scanning an image data file to determine the presence of a payload, including the steps of identifying the values of one or more lower-order bits in the bytes of an uncompressed image data file to determine the distribution of values at one or more bit positions, and comparing bit position images to reveal hidden payloads from significant variations in contiguous color blocks in the bit position images not otherwise explainable from the original image.

1 Claim, 3 Drawing Sheets

METHOD OF DETECTING STEGANOGRAPHICALLY HIDDEN IMAGES VIA LOW-ORDER BIT COMPARISONS

BACKGROUND OF THE INVENTION

Field of the Invention

The invention pertains to computer security scanning methods of steganalysis, for determining whether a digital image contains a hidden payload or message.

Description of Related Art

Steganalysis is a computer security investigational method for identifying instances of steganography, namely, the hiding of a payload (hidden message) inside an electronic document or an image data file. Because of the well-known nature of various forms of text files, it is relatively difficult to embed a hidden message in a text file with any confidence that it will remain generally undetected. However, images recorded as electronic files can involve fairly large to very large data compilations, within which it is possible to embed a hidden message or payload without the image's seemingly having been altered, at least to the human eye. Steganalysis is therefore the science of finding messages hidden through steganography, typically but not necessarily in image data files.

Steganography is not new. For example, in Dr. Patrick Juola's paper entitled, "Authorship Attribution," *Foundations and Trends in Information Retrieval*, Vol. 1, No. 3, 2006, pp. 233-334, steganography is discussed on page 268 as one of the ways to impart a digital watermark—authorship metadata—to an electronic document, with steganography's being described as a "well-studied and mature discipline." However, in steganography, implanting a payload file or hidden message is the easy part—just as it is also easy to look for or to find a message or payload one already knows is present. Steganalysis is much more difficult than steganography, in that steganalysis mounts a search for a hidden message in an image data file when there is a distinct possibility that no hidden message is there at all. In a computer security context, it can be much more important to know whether an image contains a payload or not as to know what the payload is. For example, if a payload is detected, even without decrypting it, there are known ways of extinguishing payloads in image data files. A need remains for an improved, reliable security scan to assess image data files to determine the presence of absence of an unknown payload therein.

SUMMARY OF THE INVENTION

In order to meet this need, the present method is a computer security scanning method for analyzing uncompressed image data files that determines whether the image contains a payload (hidden message). More particularly, the inventive method of steganalysis is an automated data analytical method in which low order bit comparisons are made to reveal the presence or absence of a payload in an uncompressed image data file.

DETAILED DESCRIPTION OF THE INVENTION

Figure 1:
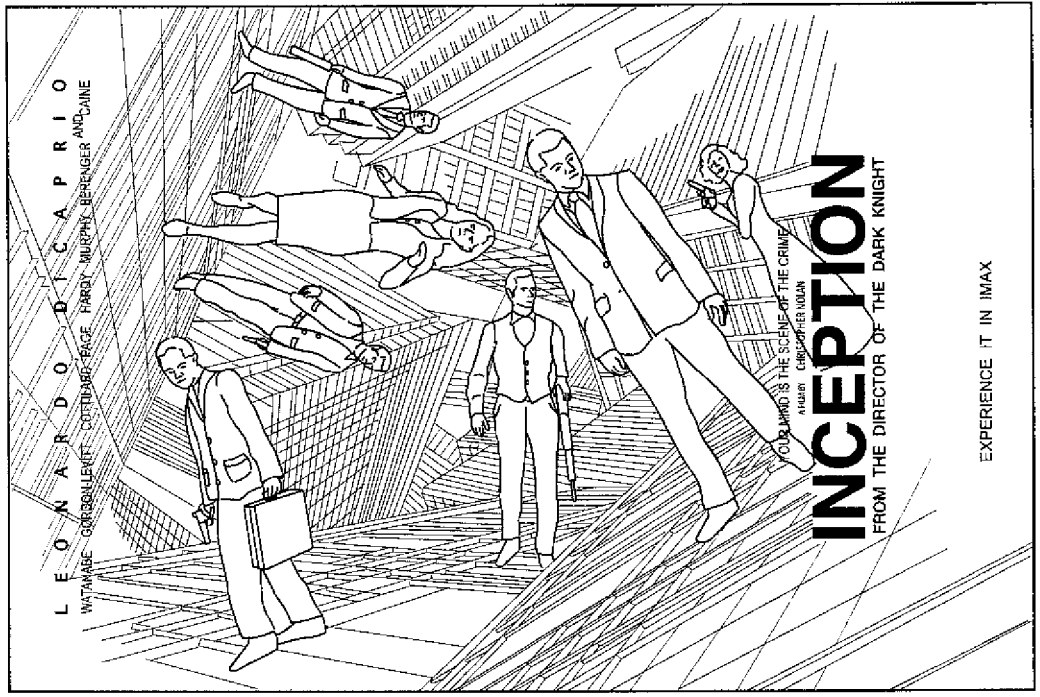
FIG. 1 is a side by side comparison of two seemingly (visually) identical movie posters for the movie, INCEPTION, which appear to be the same although the left-hand image contains a hidden steganographic payload.
Figure 1:
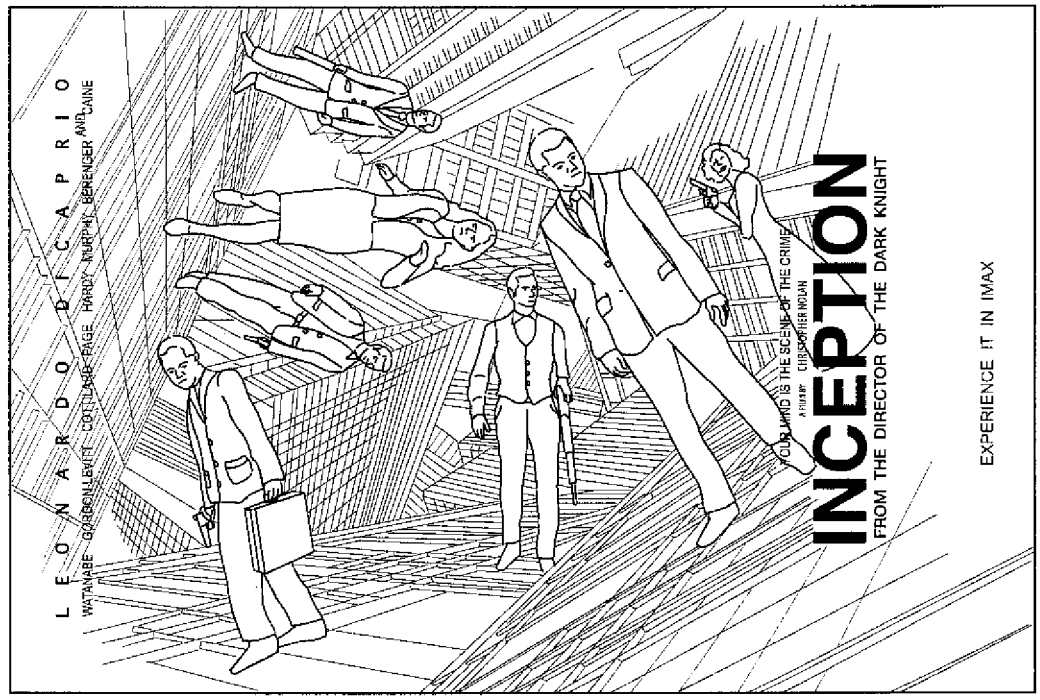

As described above, the present method is a computer security scanning method for analyzing uncompressed image data files that determines whether the image contains a payload (hidden message). More particularly, the inventive method of steganalysis is an automated data analytical method in which low order bit comparisons are made to reveal the presence or absence of a payload in an uncompressed image data file.

By way of background to the explanation, various aspects of images are normally stored in image data files as numbers, and then those numbers are stored as bits ("bit"="binary digit"). In other words, bitmapped images render all the stored information in the image as pixels, with each pixel data stored as a number, and the numbers are in turn rendered as data bits. With 8 bits in a byte in a typical 8 bit bitmapping system, each byte will have 8 digits and the "least significant bit" will be the digit (bit) in the far right hand position of the byte, in the "one" position ("xxxxxxx1") which can be either 1 (xxxxxxx1) or zero (xxxxxxx0), and wherein x is any of the other bits in the byte. Because of the binary nature of bits, if an image were a completely random collection of all possible color pixels uniformly distributed, without image alteration the distribution of zeroes and ones in the least significant bit throughout all (or a representative sampling) of the image bytes should always be—in any given unaltered image data file—50:50, as a matter of statistical likelihood. However, real life images are not uniform distributions of all color pixels because colors concentrate in recognizeable image areas—a white background, for example, will contribute a disproportionately large number of white pixels to the overall pixel color count. Therefore, for steganalysis, the significant baseline pixel distribution in an image is the "color block," that is, the natural and expected groupings of like- or similarly-colored pixels in multiple clusters throughout an image. For simplicity, the color block can be counted linearly, in for example only the x or the y axis, or the color blocks may be counted two-dimensionally. The point, however, is to count the pixels in contiguous color blocks in an image in any consistent fashion.

In order better to illustrate the present method of steganalysis, a counterpart steganography explanation is illustrative. In an uncompressed color image data file, there are literally numbers between 0-255 (in exceptional circumstances, 0-300) which represent the color value of each pixel. Each pixel is made up of three values, namely, a red, green and blue value. Each of the red, green or blue values is 8 bits in size and represents the luminosity of the applicable pixel color from 0 to 255. The difference between 254 and 255 is nearly or virtually invisible to the human eye, and as to any pixel the least one might change it would be to alter the bit representing the "1" position (xxxxxxx1 or xxxxxxx0, where x represents the other bits in the byte), which would be the least significant alteration to the pixel possible while still embedding a datum in the pixel. In other words, the best datum candidate for embedding a payload or hidden message in a data file is systematically to alter the bits representing the "1" position, which in practice will change the luminosity of any given pixel less than changing any other bit would do. The bit in the "1" position is, both numerically and actually, the "least significant bit." In order to prepare a least significant bit manipulation of an uncompressed color image data file, then, one changes 1 least significant bit per color—and therefore 3 least significant bits per pixel (one for each of the three colors)—and, to repeat, change only the bit in the "1" position—that is, the position at the far right of the numerically rendered byte, or in the position of the least significant bit. By putting the hidden message or payload only into changes in the "1" position of three bytes per pixel, the change in the data will be virtually invisible to a human observer, but plenty of data can be embedded—encoded or encrypted, presumably—in the image, for later retrieval by its intended recipient (or detectable by steganalysis).

Considering the previous paragraph, it should be apparent that virtually all encoded payloads or hidden messages will by definition alter certain bits in an uncompressed image data file. Most likely, too, the embedded data will concentrate in the bits of lesser significance in each byte, because— as a practical matter—altering the bits of greater order significance in a data byte will increase the chance that the image will appear to have been altered to an observer of the visual image. However, as steganography advances, steganographers might in turn avoid altering the least significant bit for this very reason. The present invention is a robust detection method—computer scan with output to a user—for image data file alteration bit-position by bit-position (at least three or more bit-positions), for the reliable determination that an image has been altered with a hidden message or secret payload. Known electronic signatures or embedded digital watermarks need not cause an image data file to fail the present scan—because such electronic signatures or embedded digital watermarks may be shared with appropriate computer security personnel and verified by means known in the art. The present method scans for and identifies any other unauthorized payloads or illicitly hidden messages in uncompressed image data files.

If one wishes to analyze the least significant bit in a byte, the far-right-hand digit of the bit can be only one of two values—either 0, or 1. However, images are never perfect and frequently contain noise of various kinds—imperfections attributable to the image capture equipment or lighting, or the method of reproducing an image to create an image data file. Noise itself is not suspicious in an image—but discrepancies in noise (generally seen as additional noise) throughout an image may well be an indication of steganography. An easy way to visualize whether the least significant bit is 0 or 1 is to copy the image and change only one of the two values, systemically throughout the image data file copy. For example, if a suspected image is digitally copied, it can then have all its least significant bits that are "zero" left alone, while automatically changing each least significant bit valued at "1" to 255. It may be virtually impossible for the human eye to distinguish 254 from 255, but it is easy for the human eye to see the color difference between 1 and 255! The copied, altered image will then visually have extremely apparent pixel modification, in patterns which are often visible and make for a clear visual indication that a payload or hidden message is encrypted in the image. The purpose of this image alteration is not to decode the payload or hidden message, but to provide an easily detected indication—by human eye or robotic detection—that the image data file contains a payload, as an optional step of the present method (described below) or even just as an illustration of the overall concept herein. (Alternatively, the ones in the applicable bit position could be left alone and all the zeros changed to 255. As a further alternative, a different number than 255 may be selected as the number to be substituted—as long as the substitution number is something significantly different from 0 or 1 in a pixel, such as a number of 10 or higher, preferably 50 or higher, more preferably 100 or higher and most preferably 200 or higher.)

Building on the image copy/bit number substitution described in the previous paragraph, after counting and computing the bit value ratio in at least two bit positions throughout the image, optionally one or more image data file copies are prepared in which active modification to each copy is then made by automatically changing one of the two bit values in one bit position throughout all the bytes in the copied data file(s). As a nonlimiting example, if the image data file is copied twice, the first copy can be changed as to its "xxxxxxx0" values by leaving the zero value alone, whereas each "xxxxxxx1" value is changed to 255. The second image data file copy is altered the same way, but as to the next least significant bit position—or some other bit position, preferably a relatively lower order bit position rather than a relatively higher order bit position. The third relatively higher order bit position may then be made to yield a further bit position image, and so forth. The resulting altered image file copies can be compared visually by human or automated evaluation, wherein the pattern of discrepancies in the bit position can be visualized. For analysis other than simply by visual observation (which can be revealing in itself), the number of contiguous blocks of color in each altered image file copy is counted and compared to the same contiguous blocks of color number in the altered image corresponding to the adjacent bit position. The contiguous color block number are analyzed as described below.

Figure 2:
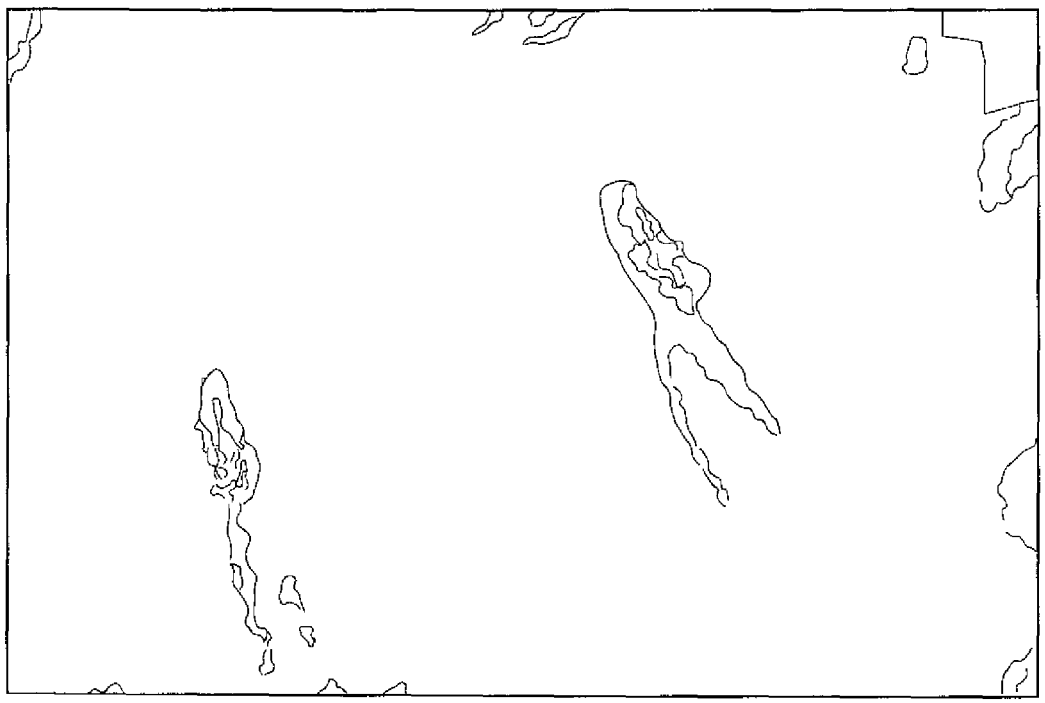
FIG. 2 is a side by side comparison of the same images as shown in FIG. 1 except that they have been subjected to the lowest order bit comparison method of the present invention.
Figure 2:
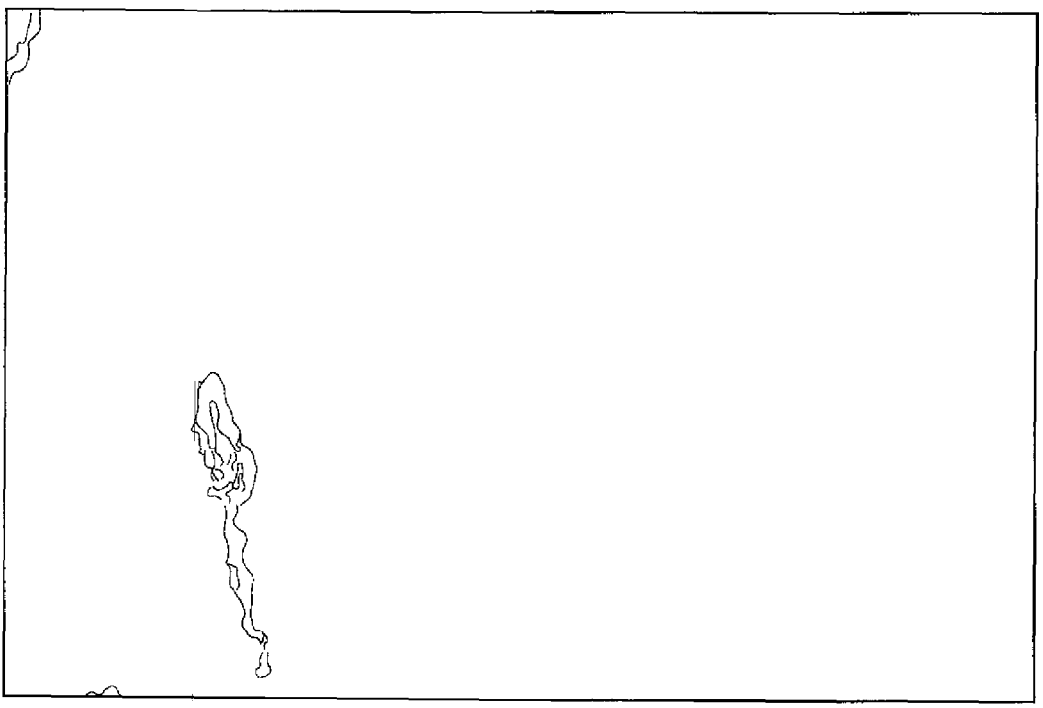

As an example of analyzing bit-position images as described above, refer to FIGS. 1-3. FIG. 1 shows two side-by-side Inception posters which, to the human eye, appear to be the same. However, the Inception poster on the left of FIG. 1 contains a secret payload placed by steganography. As shown in FIG. 2, the lowest order bit-position images prepared as described above (1 is changed to 255 and 0 remains 0) for each of the posters shown on the previous page. The human eye can easily see the presence of a payload on the image on the left side of FIG. 2, due to the large amount of noise that virtually obliterates the image portion attributable to the graphic of the actor Leonardo Dicaprio—which image is apparent in the unaltered bit-position image on the right. In other words, even the changing of only the lowest order bit position value in a uniform way can create a comparative visual image that reveals a hidden payload.

In a real-world steganalysis setting, reliable access to an original, unaltered image for comparison is unlikely or impossible. Therefore, the present invention compares at least three low-order bit position images derived from a pixellated image to be analyzed, to compare color block differences to identify numeric difference trends that indicate the presence of a payload. The best illustration of this color block comparison appears in FIG. 3.

Figure 3:
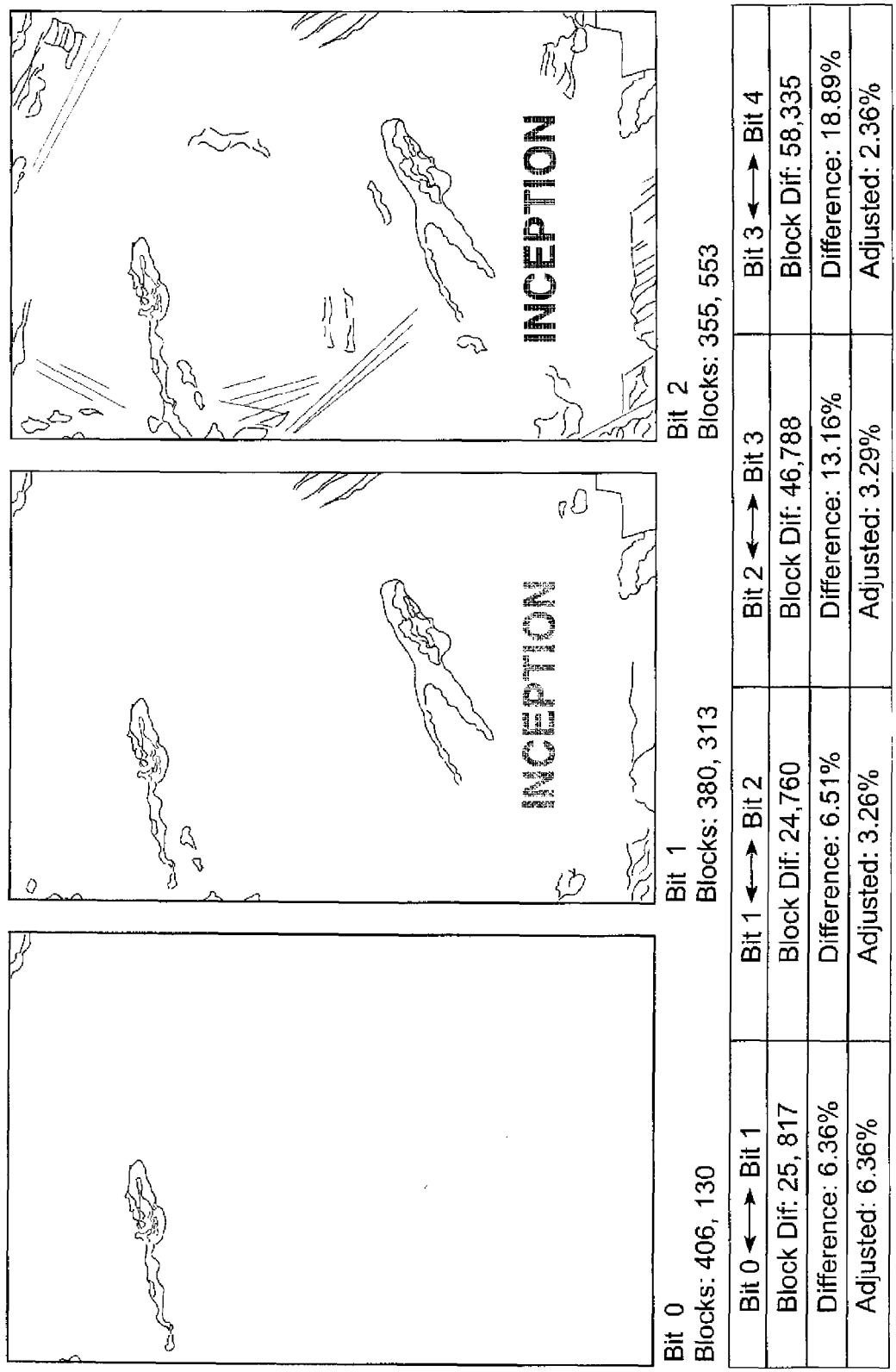
FIG. 3 is a presentation of image and calculated data identifying and in certain instances illustrating visually the concomitant use of different bit-order comparisons to analyze a digital image for the presence or absence of payload.

For the detection of payload in the Inception poster, shown on the left side of both FIGS. 1 and 2, the following low order bit comparisons were conducted and the results are presented in FIG. 3. For five bit-position images, color block differences were compared. The five bit-position images were created by a) changing the lowest order bit position 1s to 255s and leaving the 0s at 0 for the Bit 0 image. This image is shown as the image on the far left of FIG. 3. For each successively higher bit position image, the next-least-order bit position value was changed the same way— 1s became 255s and the 0s remained 0. For each of the five bit-position images of Bit 0, Bit 1, Bit 2, Bit 3 and Bit 4 four data comparisons were made as follows. In each bit-position image, the number of pixels in contiguous color blocks were counted—in this example by considering only adjacent pixels on an x-axis in any given color block. As shown in FIG. 3, the number of pixels per contiguous color block was 406,130 for Bit 0 image, 380,313 for Bit 1 image and 355,553 for Bit 2 image. No image is shown from Bit 3 or Bit 4 position images, although the data for those images appears in the accompanying table that forms a part of FIG. 3. For each bit-position image, the block difference was determined by taking the number of contiguous color blocks in the immediately lower-order bit position image and subtracting the blocks from the next higher bit position image. Each difference was then rendered as a percentage difference between bit-position images. Each percentage was then adjusted according to its relative bit position: each block difference percentage between images was divided by 2 to the order of the base bit position—so Bit 0-Bit 1 block difference percentage was 6.36% and the adjusted percentage was 6.36% (that is, 6.36% divided by 1); the Bit 1-Bit 2 block difference percentage was 6.51% divided by 2 to the first power, or 3.26%, and so on. The reason each block difference percentage considered by bit position is divided by an increasing power of 2 is to accommodate the color contiguity probabilities intrinsic to the mathematic position of the respectively altered bit.

In an unaltered image, the adjusted block difference percentages among the respective bit-position images should be approximately the same. This is so because the pixels within the color blocks—if unaltered—will register similar mathematic contiguous color blocks regardless of the bit-order of the pixel that is amplified for examination. However, in the presence of a payload, there will be a significant percentage contrast between the bit-order position containing the payload alteration and the remaining bit positions. In FIGS. 1-3, the payload is in the lowest order bit position, and indeed the adjusted block difference percentage between the Bit 0 and Bit 1 image and the remaining image comparisons (as set forth in FIG. 3) is roughly double the percentages for any other bit position. When an adjusted block position difference percentage differs significantly for a given bit-order position having systematically altered data as described above compared to one or more other bit positions, the image is flagged as containing a hidden payload.

As a practical matter, actually decoding payloads or hidden messages in data or image files is an endeavor unto itself, beyond the scope of the present invention. However, focusing on decoding or decrypting payloads distracts from the initial need for a reliable computer security scan to detect the present of a payload in the first place. It may not be at all necessary to decrypt a payload if, for security purposes, the important thing to know whether the image has been altered. If a computer security scan, embodying the present invention, can detect whether an image contains a payload—and block transmission or upload accordingly—it does not matter whether the payload is of a harmless nature, a matter of potential electronic inconvenience, or even a threat to national security. The present method of scanning for payloads in uncompressed image data files will detect (and thus be able to stop) any payload of any kind.

The invention is susceptible to variations according to, but not limited to, the following.

RGB Blocks vs Individual Colors: individual colors was not as accurate as a whole RGB block. This is because the combination of the colors is what makes a contiguous color block really identifiable. Therefore, when possible, RGB or combination color blocks should be counted as contiguous color blocks rather than just true individual contiguous colors.

Those skilled in the art will bear in mind that making an entirely data file for each bit position is not necessary to the above-described steganalysis algorithm, as there are more efficient ways to store the information as it is calculated. The above description of the bit-position images is intended to convey the concept behind the algorithm of counting and contrasting contiguous color blocks in bit-position images having systematic bit-position data alternation for analysis purposes. Having said that, the creation of bit-position images are useful—albeit optional—for any comparisons that are desired to be done by human eye or robotic inspection.

As described above, contiguous color blocks may be systematically counted on the x-axis, the y-axis or both. Going horizontally only, the vertical bar appears to be many blocks since it is divide by every horizontal level. If we count vertically as well, we can see that the many horizontal blocks form a single vertical block. The important feature of choice of contiguity counting of color blocks is to do so consistently among the various bit-position images.

Although the invention has been described with particularity above, with reference to particular features and implements, the invention is only to be limited insofar as is set forth in the accompanying claims.

The invention claimed is:

1. A method for scanning an image data file to determine the presence of a payload, comprising:
    a) automatically scanning, using a computer, an image data file to identify the values of bits in at least one fourth order or lower bit position, selected as a first bit position, and calculating and rendering as an output to a user said values of bits in said first bit position as attributable (or not) to continuous color blocks;
    b) automatically scanning, using a computer, an image data file to identify the values of bits in at least one fourth or lower bit position different from said first bit position and selected as a second bit position, and calculating and rendering as an output to a user said values of bits in said second bit position as attributable (or not) to contiguous color blocks;
    c) automatically scanning, using a computer, an image data file to identify the values of bits in at least one fourth or lower bit position different from said first or second bit position and selected as a third bit position, and calculating and rendering as an output to a user said values of bits in said third bit position as attributable (or not) to contiguous color blocks: and
    d) automatically calculating adjusted block difference percentages for each bit position and rendering as an output to a user the adjusted block difference percentages differentials to indicate the presence or absence of a payload in the image data file, wherein an alarm or event occurs to flag the image data file as suspicious for payload content.

* * * * *